E. B. GEORGIA.
Ventilating-Barrel.
No. 164,542. Patented June 15, 1875.
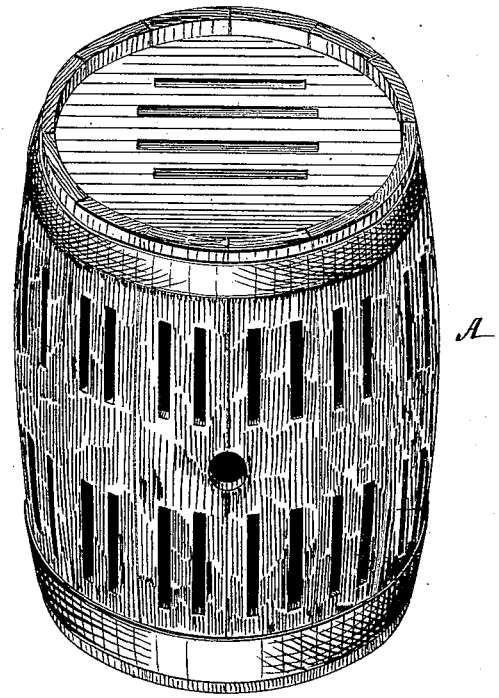
WITNESSES:
G. Matthys
Solon C. Kemon
INVENTOR:
E. B. Georgia
BY
ATTORNEYS.
THE GRAPHIC CO.PHOTO-LITH.39 & 41 PARK PLACE.N.Y.

UNITED STATES PATENT OFFICE.

ELIJAH B. GEORGIA, OF CLIFTON, VIRGINIA, ASSIGNOR TO HIMSELF AND MARGARET HETZEL, OF SAME PLACE.

IMPROVEMENT IN VENTILATING-BARRELS.

Specification forming part of Letters Patent No. 164,542, dated June 15, 1875; application filed April 6, 1874.

*To all whom it may concern:*

Be it known that I, ELIJAH B. GEORGIA, of Clifton, in the county of Fairfax and State of Virginia, have invented a new and Improved Ventilating-Barrel; and I do hereby declare that the following is a full, clear, and exact description of the same, reference being had to the accompanying drawing, forming a part of this specification, which is an elevation in perspective.

The invention relates to means whereby fruits may be packed, transported, and kept without deterioration for a considerable period.

The invention will first be fully described in connection with all that is necessary to a full understanding thereof, and then pointed out in the claims.

A represents a fruit keg or barrel. In fruit-holders it is a great object to allow the gases of putrefaction, which will always to some extent be generated, to readily escape or be taken up by an absorbent, so that the same may not be imbibed through the pores of the fruit, and cause a more or less rapid decomposition. For this purpose I employ a keg or barrel, A, having the staves sawed or incised longitudinally, or with the grain, so as to give the necessary aeration without weakening materially the stave, and so as to avoid breaking the continuity of the joint between contiguous staves, thereby lessening the stability of the keg or barrel, and causing it more readily to fall to pieces.

Having thus described my invention, what I claim is—

1. A fruit keg or barrel having longitudinal apertures in the body of the stave, and at a distance from the joint of any two, as and for the purpose described.

2. The within-described barrel, made tight at and near the middle, where it has the largest diameter, and having openings where the barrel is reduced in diameter, all as set forth.

ELIJAH B. GEORGIA.

Witnesses:
 HENRY D. RICE,
 L. MAKELY.